(12) United States Patent
Kuriya et al.

(10) Patent No.: US 11,407,036 B2
(45) Date of Patent: Aug. 9, 2022

(54) MACHINE TOOL

(71) Applicant: DMG MORI CO., LTD., Nara (JP)

(72) Inventors: Tatsuhiko Kuriya, Nara (JP);
Katsuhito Miyahara, Nara (JP);
Atsushi Tokuhara, Nara (JP)

(73) Assignee: DMG MORI CO., LTD., Nara (JP)

( * ) Notice: Subject to any disclaimer, the term of this patent is extended or adjusted under 35 U.S.C. 154(b) by 263 days.

(21) Appl. No.: 16/493,645

(22) PCT Filed: Nov. 28, 2017

(86) PCT No.: PCT/JP2017/042529
§ 371 (c)(1),
(2) Date: Sep. 12, 2019

(87) PCT Pub. No.: WO2018/168096
PCT Pub. Date: Sep. 20, 2018

(65) Prior Publication Data
US 2020/0001372 A1    Jan. 2, 2020

(30) Foreign Application Priority Data

Mar. 17, 2017    (JP) .............................. JP2017-052170

(51) Int. Cl.
| B23Q 3/12 | (2006.01) |
| B23B 3/22 | (2006.01) |
| B23B 3/16 | (2006.01) |
| B23Q 11/00 | (2006.01) |

(Continued)

(52) U.S. Cl.
CPC .............. *B23B 3/22* (2013.01); *B23B 3/161* (2013.01); *B23B 3/167* (2013.01); *B23Q 3/065* (2013.01);

(Continued)

(58) Field of Classification Search
CPC ........... B23B 3/161; B23B 3/167; B23B 3/22; B23Q 3/12; B23Q 3/15513; B23Q 11/00;

(Continued)

(56) References Cited

U.S. PATENT DOCUMENTS

| 6,164,881 A | 12/2000 | Shono |
| 10,081,086 B2 * | 9/2018 | Kuyo ................. B23Q 11/1023 |

(Continued)

FOREIGN PATENT DOCUMENTS

| CN | 205380492 U | 7/2016 |
| DE | 102015121574 A1 | 6/2016 |

(Continued)

OTHER PUBLICATIONS

International Search Report for related Application No. PCT/JP2017/042529; report dated Jan. 30, 2018.

(Continued)

*Primary Examiner* — Sara Addisu
(74) *Attorney, Agent, or Firm* — von Briesen & Roper, s.c.

(57) ABSTRACT

A machine tool (1) removes chips adhering to a working portion of a tool (T). More specifically, a fluid injecting nozzle (23, 24) injects a fluid toward the tool (T) enclosed in an enclosure (22). A controller (15) controls a position of the tool (T) within the enclosure (22), and further controls operation of the fluid injecting nozzle (23, 24) such that the fluid is injected when the tool (T) is within the enclosure (22).

3 Claims, 4 Drawing Sheets

(51) Int. Cl.
    *B23Q 3/06*     (2006.01)
    *B23Q 3/155*    (2006.01)
    *B23Q 39/00*    (2006.01)
(52) U.S. Cl.
    CPC .............. *B23Q 3/12* (2013.01); *B23Q 11/005* (2013.01); *B23Q 3/15513* (2013.01); *B23Q 2039/004* (2013.01); *Y10T 29/5114* (2015.01)
(58) Field of Classification Search
    CPC ... B23Q 11/005; B23Q 11/0891; B23Q 11/10; B23Q 3/065; B23Q 2039/004
    See application file for complete search history.

(56) References Cited

U.S. PATENT DOCUMENTS

| | | | | |
|---|---|---|---|---|
| 10,889,012 | B2* | 1/2021 | Morimura | B25J 19/0058 |
| 2017/0209974 | A1* | 7/2017 | Angel | B23Q 5/043 |
| 2020/0122283 | A1* | 4/2020 | Sugiura | B25J 11/005 |
| 2020/0262015 | A1* | 8/2020 | Takada | B23Q 11/0825 |

FOREIGN PATENT DOCUMENTS

| | | |
|---|---|---|
| DE | 102016102440 A1 | 8/2016 |
| GB | 2312501 A | 10/1997 |
| JP | S62004549 A | 1/1987 |
| JP | H02007786 B2 | 2/1990 |
| JP | 2002-292542 A | 10/2002 |
| JP | 2009-202285 A | 9/2009 |

OTHER PUBLICATIONS

Extended European Search Report for related Application No. EP 17901254.7; report dated Nov. 20, 2020.

* cited by examiner

MACHINE TOOL

TECHNICAL FIELD

The present invention relates to a machine tool including a mechanism for removing machining chips adhering to a tool.

BACKGROUND ART

In the field of machining using a machine tool, handling of machining chips produced by machining operations has been one of the problems to be solved. For example, if chips produced by a cutting operation wind around or adhere to the tool tip, the chips deteriorate the surface accuracy of the machined surface. In the worst case, the chips result in breakage of the cutting tool tip.

Accordingly, there has been proposed a machine tool having a configuration in which a coolant nozzle injecting coolant toward a tool tip and an air blow nozzle injecting air toward the tool tip are provided on a turret of a tool rest (see Patent Literature 1 listed below). In this machine tool, coolant injected from the coolant nozzle and air injected from the air blow nozzle prevent chips from winding around or adhering to the tool tip. Note that the coolant and air blow also function to cool the tool tip as well as a workpiece.

CITATION LIST

Patent Literature

[Patent Literature 1] Japanese Examined Patent Application Publication No. H2-7786

SUMMARY OF INVENTION

Technical Problem

By the way, currently, a typical machine tool includes a tool changer with a tool magazine capable of containing multiple tools, the tool changer extracting a necessary tool from the tool magazine as appropriate and changing a tool attached to a spindle with the extracted tool.

In such a machine tool, if chips adhere to a held portion of a tool to be held in a spindle hole, when the tool is attached to the spindle, the tool is attached to the spindle with run-out and the chips are stuck between the held portion of the tool and the spindle hole, which causes the problem that the tool and the spindle are damaged.

Accordingly, conventionally, in order to prevent such a problem, when a tool is detached from the spindle and returned to the tool magazine, the held portion of the tool is cleaned by means of air blow. Thereby, the tool is prevented from being returned to the tool magazine with chips adhering to the held portion thereof.

However, cleaning only the held portion of a tool in the above-described manner causes another problem that the held portions of the tools in the tool magazine cannot be kept clean. That is to say, if chips adhere to a portion or portions other than the held portion of a tool, it is possible that, when the tool is transferred in the tool magazine, the chips adhering to the tool fall or scatter around due to vibration occurring during the transfer and the chips adhere to the held portion of another tool which is positioned below or around the tool.

Therefore, in order to keep the held portions of the tools in the tool magazine keep, it is necessary to remove chips adhering to the portions other than the held portion of each tool. However, in the above-described conventional machine tool, coolant and air blow are used for the purpose of preventing chips produced during a machining operation from winding around or adhering to the tool tip, and the areas of injection of the coolant and the air blow are therefore concentrated on the tool tip. Therefore, it is not possible to sufficiently remove chips winding around or adhering to the portions other than the tip and held portion of the tool.

The present invention has been achieved in view of the above-described circumstances, and an object thereof is to provide a machine tool which is able to effectively remove machining chips adhering to a portion excluding a held portion and including a machining working portion of a tool.

Solution to Problem

The present invention, for solving the above-described problems, relates to a machine tool, including:

a tool holding unit holding a tool;

a feed mechanism moving the tool holding unit in at least one axis direction;

an enclosure provided within an operating area of the tool, the enclosure having an opening and having an interior area into which a portion of the tool exposed outside from the tool holding unit can be partially or entirely enclosed through the opening;

a fluid injecting nozzle provided on at least one of the tool holding unit and the enclosure and injecting a fluid toward the tool enclosed in the enclosure; and a controller controlling the feed mechanism such that the tool is enclosed into the enclosure by moving the tool holding unit, and controlling an injecting operation of the fluid injecting nozzle such that the fluid is injected in a state where the tool is enclosed in the enclosure.

In this machine tool, the feed mechanism is driven under control by the controller so that the tool holding unit is moved in one axis direction, whereby a portion of the tool exposed outside from the tool holding unit can be partially or entirely enclosed into the interior area of the enclosure through the opening of the enclosure, or the tool can be pulled out of the enclosure.

A fluid is injected from the fluid injecting nozzle toward the tool under control by the controller in a state where the tool is enclosed in the enclosure; the fluid injected from the fluid injecting nozzle acts on the tool enclosed in the enclosure, preferably the entirety thereof, so that machining chips adhering to the portion of the tool enclosed in the enclosure are removed by the injected fluid.

As described above, with this machine tool, an appropriate portion, inclusive of a machining working portion, of a tool which has finished a machining operation is enclosed into the enclosure and then a fluid is injected from the fluid injecting nozzle; thus, machining chips adhering to the machining working portion etc. of the tool are removed by the injected fluid. Further, since the removal of the machining chips is performed within the interior of the enclosure that is a closed space, the removed machining chips are prevented from scattering around.

In a case where the thus-configured machine tool has a tool changer as described above provided therein, the tool is stored into the tool magazine after the portion excluding the portion (held portion) held by the tool holding unit of the tool is cleaned. This advantage enables the inside of the tool magazine to be kept clean, thereby preventing the held portion of each tool in the tool magazine from being soiled or damaged by machining chips. Further, since the machining working portion of the tool is sufficiently cleaned, when replacing a throw-away tip that is a cutting edge of the tool, the operator can replace the throw-away tip efficiently without any additional cleaning operation (air blow or the like).

Note that, in the present invention, the enclosure may have any shape. For example, the enclosure may have a box shape or a cylindrical shape. Further, the fluid injected from the fluid injecting nozzle may be a liquid or a gas. Specific examples of the fluid are coolant and compressed air that are used in typical machine tools.

Further, the machine tool according to the present invention may further include a turret rotatably supported and holding a tool. In this case, the machine tool can have a configuration in which the tool holding unit is a spindle configured such that the tool can be attached thereto, and the enclosure is attached to the turret.

With this a configuration, since the enclosure is disposed on the turret rotatably supported, the enclosure is able to rotate along with the turret. Therefore, after machining chips are removed by means of the fluid injecting nozzle and then the tool is pulled out of the enclosure, the machining chips that are accumulated inside the enclosure can be ejected to an area below a machining area by rotating the turret to a position at which the opening of the enclosure is directed downward. Note that a typical machine tool usually has a conveyor or the like provided in the area below the machining area for ejecting machining chips to the outside of the machine tool.

Further, in the present invention, the machine tool may have a configuration in which the turret is formed in a polygonal prism shape and has a plurality of instrument attachment surfaces on side surfaces thereof, and the enclosure has a bottom on a side opposite to the opening and is attached at the bottom side thereof to one of the instrument attachment surfaces.

Further, in the present invention, the machine tool may have a configuration in which the turret is formed in a polygonal prism shape, has a plurality of instrument attachment surfaces on side surfaces thereof, and has an end surface perpendicular to the instrument attachment surfaces, and the enclosure is attached at a portion of an outer surface thereof to the end surface of the turret.

Further, in the present invention, the machine tool may have a configuration in which the tool holding unit is constituted by a turret rotatably supported and holding a tool. In this case, it is preferred that the enclosure is configured to be movable between a position set outside the operating area of the tool and a position set within the operating area of the tool.

Advantageous Effects of Invention

With the machine tool according to the present invention, an appropriate portion, inclusive of a machining working portion, of a tool which has finished a machining operation is enclosed into the enclosure and then a fluid is injected from the fluid injecting nozzle; thus, machining chips adhering to the machining working portion etc. of the tool are removed by the injected fluid. Further, since the removal of the machining chips is performed within the interior of the enclosure that is a closed space, the removed machining chips are prevented from scattering around.

In the case where the machine tool has a tool changer provided therein, the tool is stored into a tool magazine after the portion excluding the held portion of the tool is cleaned. This advantage enables the inside of the tool magazine to be kept clean, thereby preventing the held portion of each tool in the tool magazine from being soiled or damaged by machining chips. Further, since the machining working portion of the tool is sufficiently cleaned, when replacing a throw-away tip that is a cutting edge of the tool, the operator can replace the throw-away tip efficiently without any additional cleaning operation.

DESCRIPTION OF EMBODIMENTS

Hereinafter, machine tools according to embodiments of the present invention will be described with reference to the drawings.

First Embodiment

Figure 1:
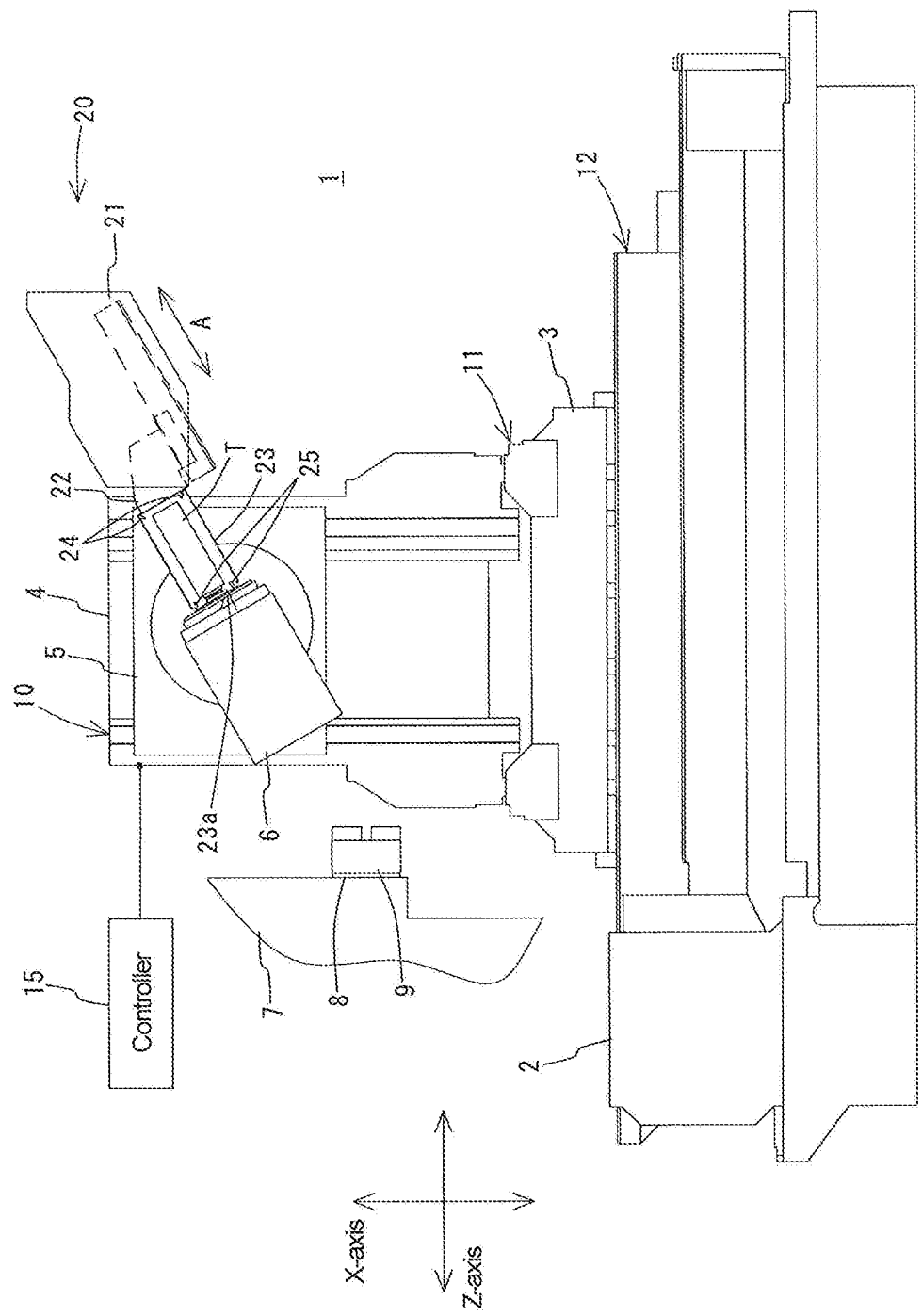
FIG. 1 is a front view of a machine tool according to an embodiment of the present invention.

Here, a machine tool according to a first embodiment of the present invention is described based on FIG. 1. As shown in FIG. 1, the machine tool 1 according to the first embodiment includes, as essential structures thereof, a bed 2, a carriage 3 provided on the bed 2 to be movable in a Z-axis direction (lateral direction) that is indicated by an arrow in FIG. 1, a column 4 provided on the carriage 3 to be movable in a Y-axis direction (back-and-force direction) that is orthogonal to the drawing sheet of FIG. 1, a saddle 5 provided on the front face of the column 4 to be movable in an X-axis direction (vertical direction) that is indicated by an arrow in FIG. 1, and a headstock 7 provided on the saddle 2 at the left side of the column 4.

A tool spindle 6 is provided on the saddle 5, which holds a tool T and rotates the tool T about an axis of rotation perpendicular to the Y-axis. The tool spindle 6 is configured to be turnable about an axis of turning parallel to the Y-axis. A workpiece spindle 8 is disposed such that an axis thereof extends along the X-axis, and is supported by the headstock 7 to be rotatable about the axis. Further, the workpiece spindle 8 has a chuck 9 provided on an end thereof, which clamps a workpiece (not shown).

Note that the carriage 3 is moved in the Z-axis direction by a Z-axis feed mechanism 12, the column 4 is moved in the Y-axis direction by a Y-axis feed mechanism 11, and the saddle 5 is moved in the X-axis direction by an X-axis feed mechanism 10.

Further, a chip removal mechanism 20 is disposed at an upper position at the right side of the column 4 as viewed from the front side. The chip removal mechanism 20 is composed of a support 21, a movable rest 22 supported by the support 21, an enclosure 23 supported by the movable rest 22, and two fluid injecting nozzles 24 provided inside the enclosure 23.

The movable rest 22 is provided to be movable in the direction indicated by arrow A in FIG. 1, the arrow A direction being inclined upward to the right at an angle of approximately 30 degrees in an X-Z plane. The movable rest 22 is driven by an appropriate transfer mechanism, which is not shown in the drawings, so as to move between an advanced position set within an operating area of the tool T and a retracted position set outside the operating area of the tool T.

The enclosure 23 is composed of a bottomed box-shaped member having an opening 23a through which the tool T can be inserted into and pulled out of the enclosure 23. As shown in FIG. 1, when the movable rest 22 is advanced to the advanced position in a state where the tool spindle 6 has been moved to a position designated to a chip removal position and has been turned to an angle such that the axis thereof extends along the arrow A direction, an exposed portion of the tool T held by the tool spindle 6, which is a portion exposed outside from the tool spindle 6, is inserted into the enclosure 23 through the opening 23a and enclosed by the enclosure 23. When the movable rest 22 in this state is retracted to the retracted position, the tool T pulled out of the enclosure 23. Note that the retracted position is spaced from the operating area of the tool T as well as an operating area of the tool spindle 6 so that the enclosure 23 does not interfere with the tool T and the tool spindle 6.

The fluid injecting nozzles 24 are supplied with compressed air from an appropriate compressed air source (not shown) through an appropriate channel (not shown). Further, a fluid injecting nozzle 25 is provided on an end of the tool spindle 6 located on the tool T side. The fluid injecting nozzle 25 is also supplied with compressed air in a simmer manner. The fluid injecting nozzles 24 and 25 are arranged so as to inject compressed air toward the tool T enclosed in the enclosure 23, and the injection of compressed air from each of the fluid injecting nozzles 24 and 25 is controlled by an appropriate control valve (not shown).

The machine tool further has a tool changer attached thereto, which is not shown in the drawings. The tool changer includes a tool magazine holding multiple tools, and a tool change arm. The tool change arm changes the tool T held by the tool spindle 6 with an appropriate tool extracted from the tool magazine when the tool spindle 6 is positioned at a tool change position.

Operations of the X-axis feed mechanism 10, the Y-axis feed mechanism 11, the Z-axis feed mechanism 12, the tool spindle 6, the workpiece spindle 8, the control valves (not shown), and the tool changer (not shown) are controlled by a controller 15.

In the machine tool 1 according to this embodiment having the above-described configuration, under control by the controller 15, the tool spindle 6 is moved in a three-dimensional space by the X-axis feed mechanism 10, the Y-axis feed mechanism 11, and the Z-axis feed mechanism 12, whereby a workpiece (not shown) clamped by the chuck 9 is machined by a tool T held by the tool spindle 6.

Once the machining using the tool T is finished, under control by the controller 15, the tool spindle 6 is moved to the chip removal position, and then chips adhering to the tool T are removed by the chip removal mechanism 20 in the manner described below. That is to say, first, the tool spindle 6 is turned to an angle such that the axis thereof extends along the arrow A direction, and then the movable rest 22 is advanced to the advanced position by the transfer mechanism (not shown). Thereby, the exposed portion, inclusive of a machining working portion (cutting part), of the tool T held by the tool spindle 6 that is exposed outside from the tool spindle 6 is inserted into the enclosure 23 through the opening 23a and enclosed by the enclosure 23.

Subsequently, under control by the controller 15, the control valves (not shown) are driven to cause the fluid injecting nozzles 24 provided on the bottom inside the enclosure 23 and the fluid injecting nozzle 25 provided on the end of the tool spindle 6 to inject compressed air toward the tool T enclosed in the enclosure 23. Thereby, chips adhering to the enclosed portion of the tool T that is enclosed in the enclosure 23 are removed from the tool T by jet flows of the injected compressed air. Thus, chips adhering to the tool T are removed by jet flows of the compressed air injected to the interior area of the enclosure 23 that is a closed space; therefore, the chips are removed very effectively and the removed chips are prevented from scattering around.

After the tool T is cleaned by causing the fluid injecting nozzles 24 and 25 to inject compressed air in the above-described manner for a predetermined period of time, the movable rest 22 is retracted to the retracted position by the transfer mechanism (not shown) so that the tool T is pulled out of the enclosure 23. Thereafter, a tool change operation is carried out by the tool changer (not shown).

As described above, with the machine tool 1 according to this embodiment, chips adhering to a tool T which has finished a machining operation can be removed by enclosing the tool T into the enclosure 23 and then injecting compressed air from the fluid injecting nozzles 24 and 25. Further, since the chips are removed within the interior of the enclosure 23 that is a closed space, the removed chips are prevented from scattering around. Further, since the enclosure 23 is disposed obliquely such that the opening 23a thereof is directed downward, the chips removed within the interior of the enclosure 23 automatically fall.

Therefore, with this machine tool 1, the tool T is stored into the tool magazine (not shown) after the portion excluding the portion held by the tool spindle 6 thereof is cleaned, which enables the inside of the tool magazine (not shown) to be kept clean, thereby preventing the held portions of the tools T in the tool magazine (not shown) from being soiled or damaged by chips.

Further, the cutting part of the tool T is sufficiently cleaned. Therefore, in a case where the tool T is a cutting tool, when replacing a throw-away tip of the tool T, the operator can replace the throw-away tip efficiently without any additional cleaning operation since the above-described chip removal operation has been carried out.

Second Embodiment

Figure 2:
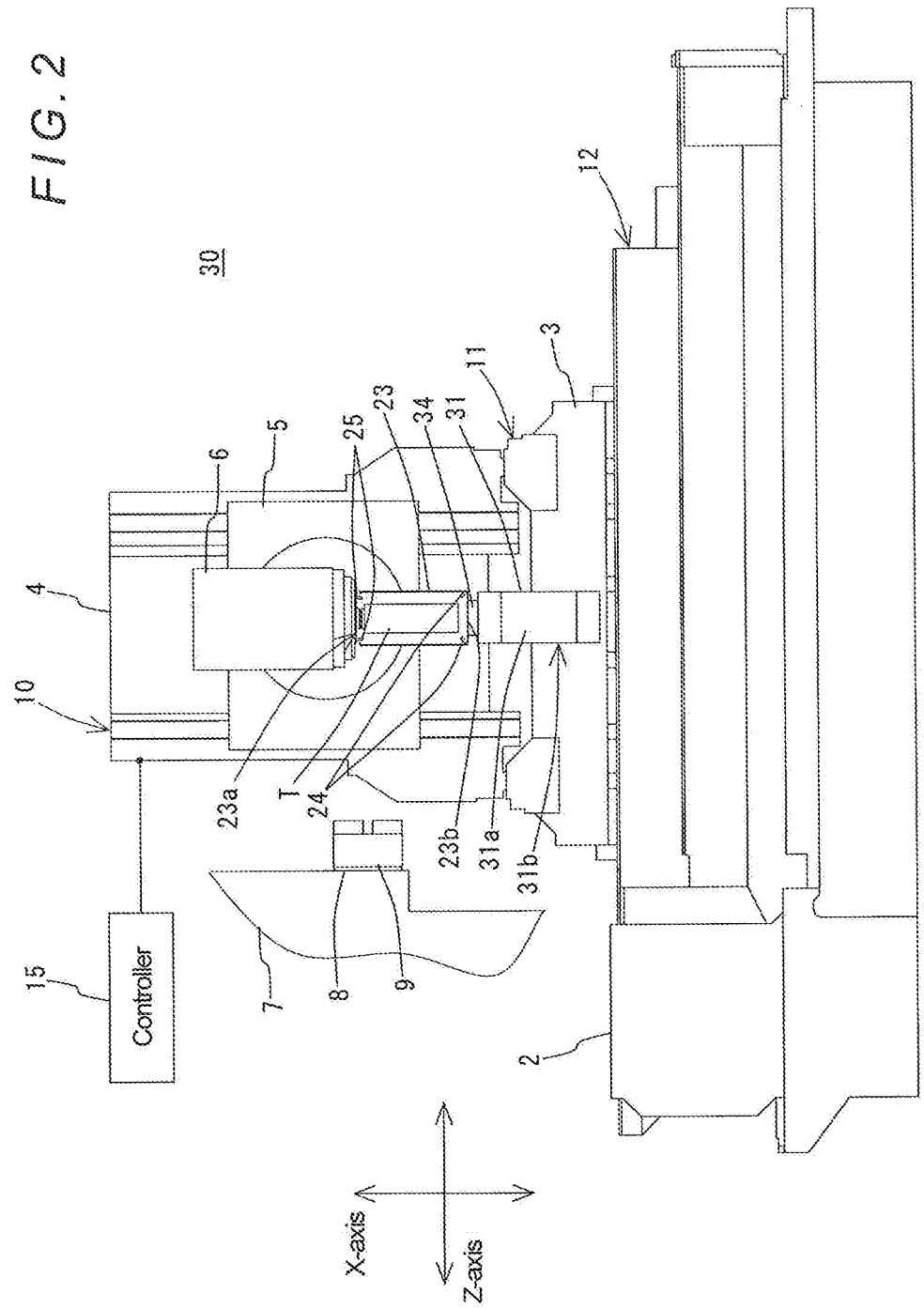
FIG. 2 is a front view of a machine tool according to another embodiment of the present invention.

Here, a machine tool according to a second embodiment of the present invention is described based on FIG. 2. As shown in FIG. 2, the configuration of the machine tool 30 according to the second embodiment is different from that of the above-described machine tool 1 according to the first embodiment in that the components of the chip removal mechanism 20 are eliminated and, instead, a turret 31 is provided and the enclosure 23 is attached to the turret 31. Accordingly, in the description of the machine tool 30 according to the second embodiment, the same components as the components of the above-described machine tool 1 are denoted by the same reference signs as used in the above description so that detailed description thereof is omitted.

The machine tool 30 according to this embodiment includes the turret 31 that has a polygonal prism shape. The turret 31 is provided to have an axis parallel to the Z-axis and is rotatable about the axis. The turret 31 is configured to be moved in the X-axis direction and in the Z-axis direction by an appropriate feed mechanism, which is not shown in the drawings. Outer side surfaces 31a and an end surface 31b located on the spindle 8 side of the turret 31 each form a tool attachment surface. In this example, the enclosure 23 is attached to one of the side surfaces 31a that are perpendicular to the X-axis, in other words, that are able to face the tool spindle 6, via bracket 34. Note that the enclosure 23 is attached at a bottom 23b thereof to the bracket 34 in a state of protruding to the tool spindle 6 side from the side surface 31a such that the opening 23a thereof is positioned on the tool spindle 6 side.

In this machine tool 30, as shown in FIG. 2, when the tool spindle 6 is moved downward along the X-axis by the X-axis feed mechanism 10 after the tool spindle 6 has been turned to an angle at which the axis thereof becomes parallel to the X-axis, and has been moved by the X-axis feed mechanism 10, the Y-axis feed mechanism 11, and the Z-axis feed mechanism 12 so that the tool T held by the tool spindle 6 is positioned above and coaxially with the enclosure 23, the exposed portion of the tool T that is exposed outside from the tool spindle 6 is inserted into the enclosure 23 through the opening 23a and enclosed by the enclosure 23. When the tool spindle 6 in this state is moved upward along the X-axis, the tool T is pulled out of the enclosure 23.

In this machine tool 30 having the above-described configuration, when a machining operation using a tool T held by the tool spindle 6 is finished, first, under control by the controller 15, the tool spindle 6 is turned to an angle at which the axis thereof becomes parallel to the X-axis, and moved so that the tool T is positioned above and coaxially with the enclosure 23. Thereafter, the tool spindle 6 is moved downward along the X-axis, whereby the tool T held by the tool spindle 6 is inserted into the enclosure 23 through the opening 23a and enclosed by the enclosure 23.

Subsequently, under control by the controller 15, the control valves (not shown) are driven to cause the fluid injecting nozzles 24 provided on the bottom inside the enclosure 23 and the fluid injecting nozzle 25 provided on the end of the tool spindle 6 to inject compressed air. Thereby, chips adhering to the enclosed portion of the tool T that is enclosed in the enclosure 23 are removed from the tool T by jet flows of the injected compressed air. Thus, chips adhering to the tool T are removed by jet flows of the compressed air injected to the interior area of the enclosure 23 that is a closed space; therefore, the chips are removed very efficiently and the removed chips are prevented from scattering around. Thus, the machine tool 30 achieves the same effect as that achieved by the above-described machine tool 1 according to the first embodiment.

Further, since the machine tool 30 employs the configuration in which the enclosure 23 is attached to the turret 31 that is a component a typical lathe includes, the machine tool 30 does not require a special mechanism like the above-described chip removal mechanism 20 of the machine tool 1, which achieves reduced equipment costs.

Note that, in this machine tool 30, removed chips are accumulated inside the enclosure 23. However, by rotating the turret 31 to a position at which the opening 23a of the enclosure 23 is directed downward, the chips accumulated inside the enclosure 23 are ejected to an area below the turret 31 through the opening 23a. The ejected chips are further ejected to the outside of the machine tool 30 by a chip conveyor (not shown) that is provided in the area below the turret 31.

Third Embodiment

Figure 3:
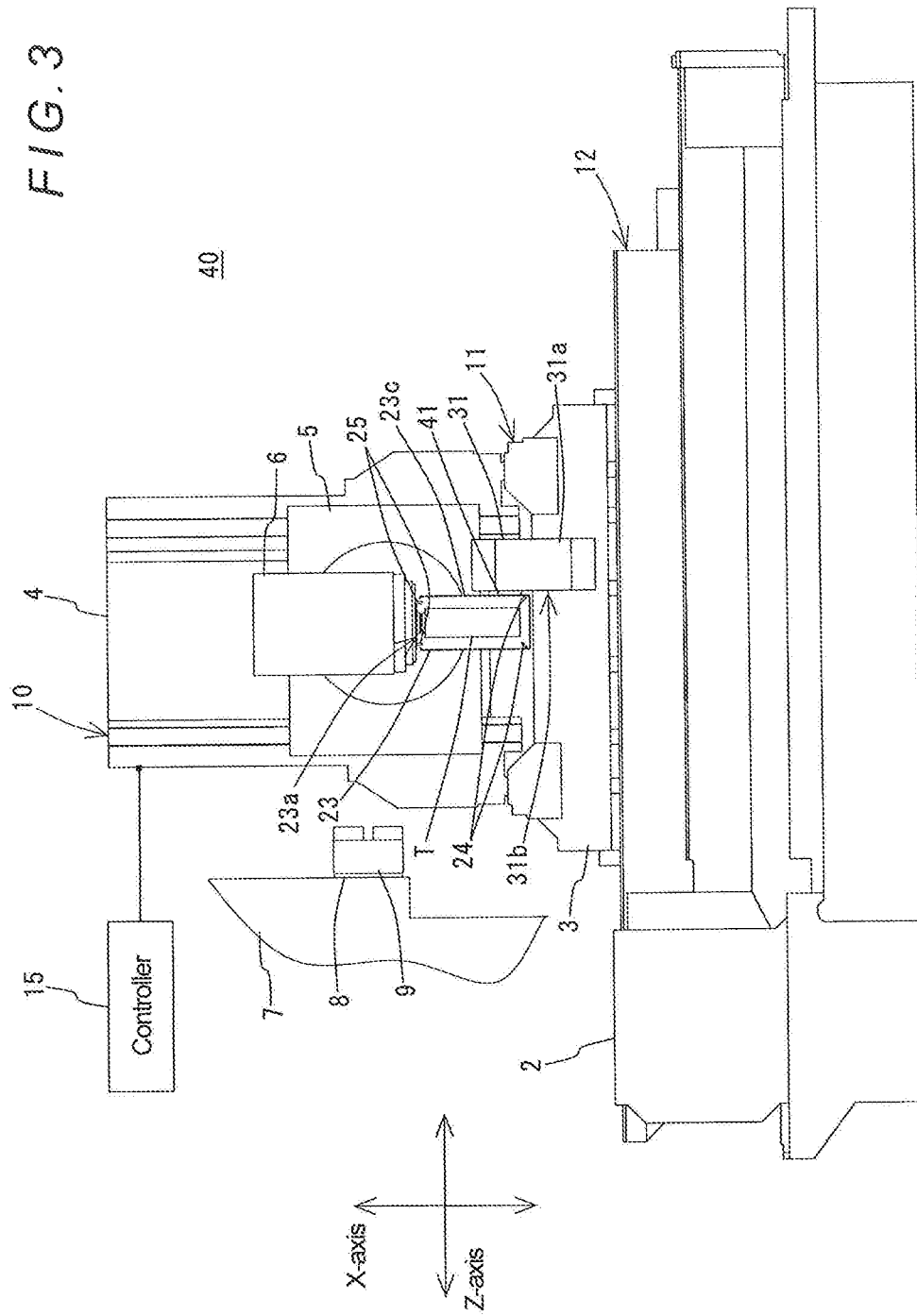
FIG. 3 is a front view of a machine tool according to a further embodiment of the present invention.

Here, a machine tool according to a third embodiment of the present invention is described based on FIG. 3. As shown in FIG. 3, the configuration of the machine tool 40 according to the third embodiment is different from that of the above-described machine tool 30 according to the second embodiment in terms of the position of attachment of the enclosure 23 to the turret 31. Accordingly, in the description of the machine tool 40 according to the third embodiment, the same components as the components of the above-described machine tool 30 and machine tool 1 are denoted by the same reference signs as used in the above description so that detailed description thereof is omitted.

As shown in FIG. 3, in the machine tool 40 according to this embodiment, the enclosure 23 is attached to the end surface 31b of the turret 31 via a bracket 41. Note that the opening 23a of the enclosure 23 is positioned on the tool spindle 6 side and an outer surface 23a thereof is attached to the bracket 41. Further, the enclosure 23 is attached to a position which allows the enclosure 23 to be positioned below and coaxially with the tool spindle 6 by operating the tool spindle 6.

Also in this machine tool 40, as shown in FIG. 3, when the tool spindle 6 is moved downward along the X-axis by the X-axis feed mechanism 10 after the tool spindle 6 has been turned to an angle at which the axis thereof becomes parallel to the X-axis, and has been moved by the X-axis feed mechanism 10, the Y-axis feed mechanism 11, and the Z-axis feed mechanism 12 so that the tool T held by the tool spindle 6 is positioned above and coaxially with the enclosure 23, the exposed portion of the tool T that is exposed outside from the tool spindle 6 is inserted into the enclosure 23 through the opening 23a and enclosed by the enclosure 23. When the tool spindle 6 in this state is moved upward along the X-axis, the tool T is pulled out of the enclosure 23.

In this machine tool 40 having the above-described configuration, when a machining operation using a tool T held by the tool spindle 6 is finished, first, under control by the controller 15, the tool spindle 6 is turned to an angle at which the axis thereof becomes parallel to the X-axis, and moved to a position such that the tool T is positioned above and coaxially with the enclosure 23. Thereafter, the tool spindle 6 is moved downward along the X-axis, whereby the tool T held by the tool spindle 6 is inserted into the enclosure 23 through the opening 23a and enclosed by the enclosure 23.

Subsequently, under control by the controller 15, the control valves (not shown) are driven to cause the fluid injecting nozzles 24 provided on the bottom inside the enclosure 23 and the fluid injecting nozzle 25 provided on the end of the tool spindle 6 to inject compressed air. Thereby, chips adhering to the enclosed portion of the tool T that is enclosed in the enclosure 23 are removed from the tool T by jet flows of the injected compressed air. Thus, chips adhering to the tool T are removed by jet flows of the compressed air injected to the interior area of the enclosure 23 that is a closed space; therefore, the chips are removed very efficiently and the removed chips are prevented from scattering around. Thus, the machine tool 40 also achieves the same effect as that achieved by the above-described machine tool 1 according to the first embodiment.

Further, since the machine tool 40 also employs the configuration in which the enclosure 23 is attached to the turret 31 that is a component a typical lathe includes, the machine tool 40 also does not require a special mechanism like the above-described chip removal mechanism 20 of the machine tool 1, which achieves reduced equipment costs.

Note that, also in this machine tool 40, removed chips are accumulated inside the enclosure 23. However, by rotating the turret 31 to a position at which the opening 23a of the enclosure 23 is directed downward, the chips accumulated inside the enclosure 23 are ejected to an area below the turret 31 through the opening 23a. The ejected chips are further ejected to the outside of the machine tool 40 by a chip conveyor (not shown) that is provided in the area below the turret 31.

Fourth Embodiment

Figure 4:
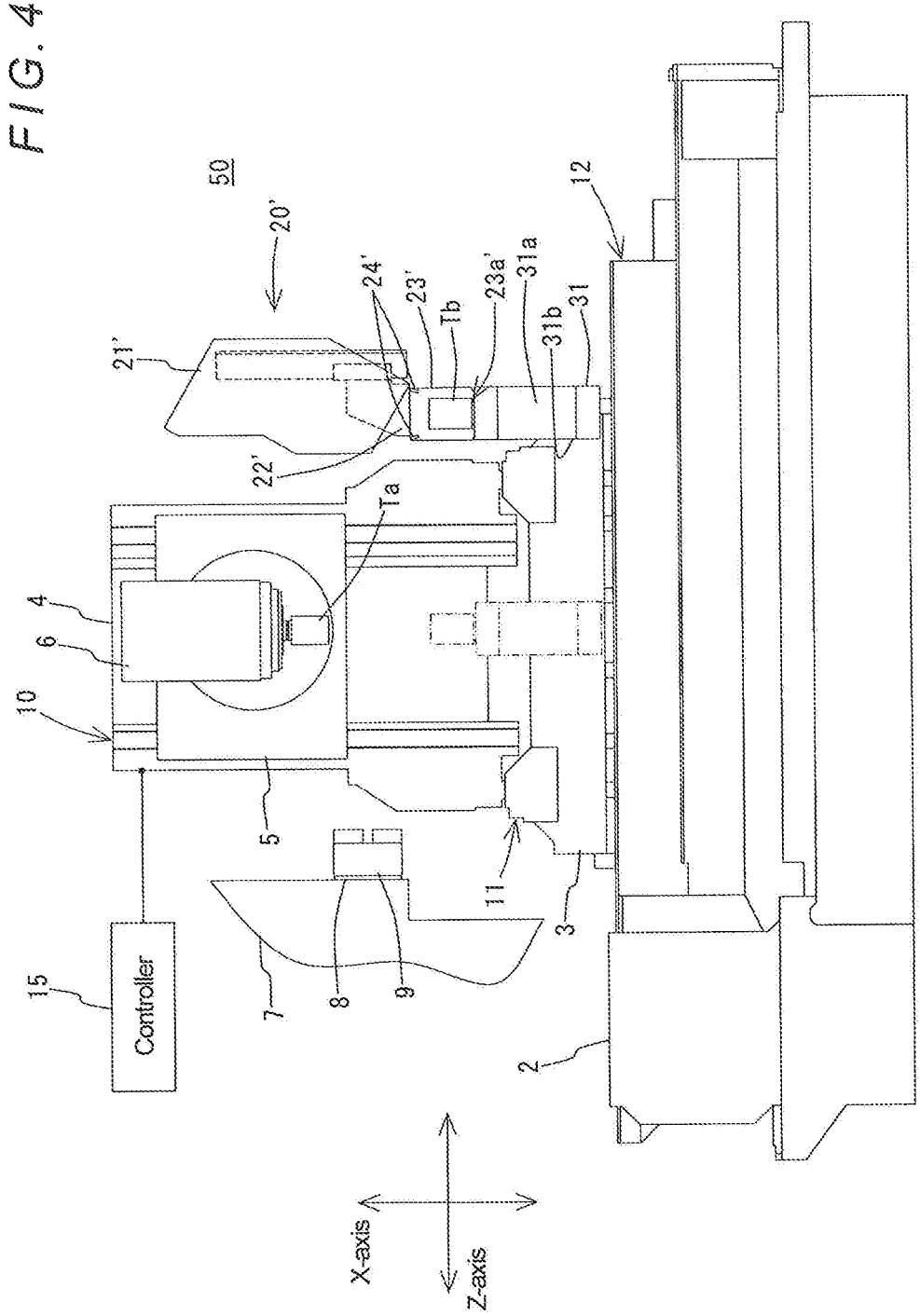
FIG. 4 is a front view of a machine tool according to another further embodiment of the present invention.

Here, a machine tool according to a fourth embodiment of the present invention is described based on FIG. 4. As shown in FIG. 4, the configuration of the machine tool 50 according to the fourth embodiment is different from that of the above-described machine tool 1 according to the first embodiment in that a chip removal mechanism 20' is provided instead of the chip removal mechanism 20 and the turret 31 is also provided similarly to the second embodiment. Accordingly, in the description of the machine tool 50 according to the fourth embodiment, the same components as the components of the above-described machine tools 1, 30, and 40 are denoted by the same reference signs as used in the above description so that detailed description thereof is omitted.

As shown in FIG. 4, in the machine tool 50 according to this embodiment, a tool Tb is held by one of the side surfaces 31a of the turret 31, and a workpiece (not shown) clamped by the chuck 9 is machined by the tool Tb. Note that, as a matter of course, the workpiece (not shown) can be machined also by a tool Ta held by the tool spindle 6.

The chip removal mechanism 20' is provided above a retraction end for the turret 31 in the Z-axis direction, i.e., a movement end for the turret 31 on the side opposite to the spindle 8 in the Z-axis direction. The chip removal mechanism 20' is composed of a support 21', a movable rest 22' supported by the support 21', an enclosure 23' supported by the movable rest 22', and two fluid injecting nozzles 24' provided inside the enclosure 23'.

The movable rest 22' is provided to be movable in the X-axis direction. The movable rest 22' is driven by an appropriate transfer mechanism, which is not shown in the drawings, so as to move between an advanced position and a retracted position, the advanced position being a lower movement end set within an operating area of the tool Tb, and the retracted position being an upper movement end set outside the operating area of the tool Tb.

The enclosure 23' is composed of a bottomed box-shaped member having an opening 23a' through which the tool Tb can be inserted into and pulled out of the enclosure 23'. The enclosure 23' is arranged such that, when the turret 31 is positioned at the retraction end in the Z-axis direction, the enclosure 23' is positioned above and coaxially with the tool Tb attached to a machining position of the turret 31. When the movable rest 22' is advanced to the advanced position by the transfer mechanism (not shown), the tool Tb attached to the turret 31 is inserted into the enclosure 23' through the opening 23a' and enclosed by the enclosure 23'. When the movable rest 22' is retracted to the retracted position by the transfer mechanism (not shown), the tool Tb is pulled out of the enclosure 23'.

The fluid injecting nozzles 24' are provided on the bottom inside the enclosure 23' that is located on the side opposite to the opening 23a. The fluid injecting nozzles 24' inject compressed air toward the tool Tb enclosed in the enclosure 23', the compressed air being supplied from an appropriate compressed air source (not shown) through an appropriate channel (not shown). Note that the injection of compressed air from the fluid injecting nozzles 24' are respectively controlled by appropriate control valves (not shown) that are controlled by the controller 15.

In this machine tool 50, when a machining operation using the tool Tb is finished, under control by the controller 15, first, the turret 31 is moved to the retraction end (this position is a chip removal position) in the Z-axis direction, and then the movable rest 22' is advanced to the advanced position by the transfer mechanism (not shown). Thereby, the tool Tb held by the turret 31 is inserted into the enclosure 23' through the opening 23a' and enclosed by the enclosure 23'.

Subsequently, similarly under control by the controller 15, the control valves (not shown) are driven to cause the fluid injecting nozzles 24' provided on the bottom inside the enclosure 23' to inject compressed air. Thereby, chips adhering to the enclosed portion of the tool Tb that is enclosed in the enclosure 23' are removed from the tool Tb by jet flows of the injected compressed air. Thus, the chips adhering to the tool Tb are removed by jet flows of the compressed air injected to the interior area of the enclosure 23' that is a closed space; therefore, the chips are removed very efficiently and the removed chips are prevented from scattering around. Further, since the enclosure 23' is disposed such that the opening 23a' thereof is directed downward, the chips removed within the enclosure 23' automatically fall. Thus, the machine tool 50 also achieves the same effect as that achieved by the above-described machine tool 1 according to the first embodiment.

Hereinbefore, several specific embodiments of the present invention have been described. However, the present invention is not limited to the above-described embodiments and can be implemented in other modes.

For example, the shapes of the enclosures 23 and 23' are not limited to a box shape that is given in the above description. The enclosures 23 and 23' may have a cylindrical shape, a spherical shape, etc.

The positions of provision of the fluid injecting nozzles 24 and 24' are not limited to the positions described in the above description. The fluid injecting nozzles 24, 24' may be provided at any position which allows jet flows of the injected compressed air to act on the tool T, Tb enclosed in the enclosure 23, 23'. Further, it is sufficient to provide either the fluid injecting nozzles 24, 24' or the fluid injecting nozzle 25. Furthermore, there is no limitation on the numbers of the fluid injecting nozzles 24, 24', and 25.

The fluid injected from the fluid injecting nozzles 24, 24', 25 may be a liquid instead of gas such as compressed air. More specifically, coolant that is used in typical machine tools may be used.

Examples of the tools in the above description include cutting tools such as a face mill, an end mill, and a drill, as well as grinding tools such as a grinding wheel.

REFERENCE SIGNS LIST

1 Machine tool
2 Bed
3 Carriage
4 Column
5 Saddle
6 Tool spindle
7 Headstock
8 Workpiece spindle
9 Chuck
10 X-axis feed mechanism
11 Y-axis feed mechanism
12 Z-axis feed mechanism
15 Controller
20, 20' Chip removal mechanism 21, 21' Support
22, 22' Movable rest
23, 23' Enclosure
23a, 23a' Opening
23b Bottom surface
23c Outer surface
24, 24' Fluid injecting nozzle
25 Fluid injecting nozzle
31 Turret
31a Side surface
31b End surface
T, Ta, Tb Tool

The invention claimed is:

1. A machine tool, comprising:
a tool spindle as a tool holding unit holding a tool, the tool spindle being configured such that the tool can be attached;
a turret formed in a polygonal prism shape, the turret having a plurality of instrument attachment surfaces on side surfaces thereof and having an end surface perpendicular to the plurality of instrument attachment surfaces;
a feed mechanism moving the tool spindle in at least one axis direction;
an enclosure attached to the turret so as to be positioned within a movement area of the tool, the enclosure having an opening and having an interior area into which a portion of the tool exposed outside from the tool spindle can be partially or entirely enclosed through the opening;
a fluid injecting nozzle provided on at least one of the tool spindle and the enclosure and injecting a fluid toward the tool enclosed in the enclosure; and
a controller controlling the feed mechanism such that the tool is enclosed into the enclosure by moving the tool spindle, and controlling an injecting operation of the fluid injecting nozzle such that the fluid is injected in a state where the tool is enclosed in the enclosure, wherein:
the enclosure has a bottom on a side opposite to the opening; and
the enclosure is attached at the bottom thereof to one of the plurality of instrument attachment surfaces of the turret or attached at an outer surface thereof to the end surface of the turret.

2. A machine tool, comprising:
a turret holding a tool;
a feed mechanism moving the turret in at least one axis direction;
an enclosure provided within a movement area of the tool attached to the turret, the enclosure having an opening and having an interior area into which a portion of the tool exposed outside from the turret can be partially or entirely enclosed through the opening;
a fluid injecting nozzle provided on at least one of the turret and the enclosure and injecting a fluid toward the tool enclosed in the enclosure; and
a controller controlling the feed mechanism such that the tool is enclosed into the enclosure by moving the turret, and controlling an injecting operation of the fluid injecting nozzle such that the fluid is injected in a state where the tool is enclosed in the enclosure.

3. The machine tool according to claim 2, wherein the enclosure is configured to be movable between a position set outside the movement area of the tool and a position set within the movement area of the tool.

* * * * *